United States Patent [19]

Mills et al.

[11] 3,770,410

[45] Nov. 6, 1973

[54] PRODUCTION OF POTASSIUM POLYPHOSPHATES FROM PHOSPHATE ACID SLUDGES

[75] Inventors: Harold E. Mills; Michael B. Caesar, both of Lake City, Fla.

[73] Assignee: Occidental Petroleum Corporation, Los Angeles, Calif.

[22] Filed: Sept. 10, 1971

[21] Appl. No.: 179,541

[52] U.S. Cl.............................. 71/1, 71/34, 71/46, 423/315
[51] Int. Cl............................................... C05b 7/00
[58] Field of Search .........................71/34–36, 1, 46, 47, 25; 423/308, 312, 315

[56] References Cited
UNITED STATES PATENTS

| | | | |
|---|---|---|---|
| 3,607,213 | 9/1971 | Wrodaw et al. | 71/34 |
| 3,653,875 | 4/1972 | Waters et al. | 423/313 |
| 2,288,418 | 6/1942 | Partridge | 71/34 |
| 3,574,591 | 5/1971 | Lyons et al. | 71/36 X |
| 2,867,522 | 1/1959 | Facer | 71/47 X |
| 3,291,594 | 12/1966 | Nickerson | 71/47 X |
| 3,455,649 | 7/1969 | Bigot | 71/34 |

*Primary Examiner*—Samih N. Zaharna
*Assistant Examiner*—Richard Barnes
*Attorney*—Andrew J. Belansky et al.

[57] ABSTRACT

Phosphate acid sludges formed in the production of wet process phosphoric acids are converted to potassium polyphosphates by reaction with a potassium salt at elevated temperatures. Sodium salts may be introduced to reduce the fusion temperature and magnesium compounds with an increase in fusion temperature; the reaction system will also accept a variety of micronutrients. The potassium polyphosphate product formed has a high degree of citrate solubility establishing its excellent utility as a fertilizer.

33 Claims, No Drawings

PRODUCTION OF POTASSIUM POLYPHOSPHATES FROM PHOSPHATE ACID SLUDGES

BACKGROUND OF THE INVENTION

The present invention relates to the formation of highly soluble potassium polyphosphate fertilizers from the phosphate acid sludges formed during the production of wet process phosphoric acids.

As part of the production of wet process phosphoric acid there is an inevitable aging at the clarification stage in which insoluble, phosphate bearing precipitates are formed. The wet process phosphoric acids normally produced may range from merchant grade, namely an acid containing about 54 percent $P_2O_5$, to higher strength acids containing up to about 82 percent $P_2O_5$.

The nature of the precipitates will vary to some degree depending upon the strength of the acid produced. They will, however, be normally comprised of a liquid phase and a solid phase. The liquid phase of the sludge is phosphoric acid, while the solid phase contains, namely, undesirable orthophosphate salts.

In most cases, the liquid phase which has some value, is not separated from the solid phase and both are utilized in the manufacture of various solid forms of ammoniated phosphate fertilizers, such as diammonium phosphate (18–46–0) which provides a total plant food of about 64 percent with no polyphosphate content.

Depending upon the degree of difficulty in separating the acid from the solids, the phosphate acid sludge may account for up to 70 percent of the total $P_2O_5$ with only 30 percent of the $P_2O_5$ being present in the collected clarified acid.

Of the phosphate acid sludge, the solid phase may contain up to about 25 percent $P_2O_5$ which is water insoluble and not completely available as a plant food.

Phosphate acid sludges have been mainly used for the production of diammonium phosphate and triple superphosphate. Both commodities, however, are in oversupply and of low profitability.

SUMMARY OF THE INVENTION

It has now been found that phosphate acid sludge may be converted to a high nutrient value potassium polyphosphate by reacting the sludge acid with a potassium salt, at temperatures of from about 750°C to about 1,100°C to form a homogeneous melt, then cooling the melt to form a solid in which all of the $P_2O_5$ is available as a fertilizer, the polyphosphate content is high and depending upon the formulation, the product may be made to have slow release of properties. In addition, it may be made nonhygroscopic and therefore readily handleable for application in the dry form.

One method for producing potassium polyphosphates comprises reacting phosphate acid sludge with a potassium salt in which the mol ratio of potassium to phosphorous ranges from about 0.3 to about 2 by intimate mixing of the phosphate acid sludge with at least one potassium salt, then heating the resultant mixture to a temperature sufficient to form a homogeneous melt, driving off all the volatile components, then cooling and solidifying the formed potassium polyphosphate. Preferably the mixture is heated to a temperature from about 750°C to about 1,100°C.

In a preferred embodiment, the mixture is pre-reacted at moderate temperatures ranging from about 100°C to about 150°C to obtain the release of as much water as possible along with some chlorine, hydrogen chloride and fluoride prior to heating to a temperature at which the melt will form.

There may, in the practice of the process of this invention, be added sodium salts to reduce the temperature at which the melt will form as well as magnesium compounds and additional plant nutrients at some sacrifice in fusion temperature.

The production of the potassium polyphosphates, in accordance with the present invention, are fully amenable to the addition of micronutrients, such as compounds of manganese, molybdenum, boron, zinc, cobalt, copper, either in the single stage reaction or in the first state of the two stage reaction.

DESCRIPTION

According to the present invention, there is provided a process for the production of potassium polyphosphates from phosphate acid sludge formed during the production of wet process phosphoric acid of any concentration.

As used herein, the term "phosphate acid sludge" is meant the solids formed in the clarification of wet process phosphoric acid alone or combination with any residual phosphate bearing liquids remaining after the clarification stage.

The process involves, in general, mixing the phosphate acid sludge, both the liquid and solid phases thereof, with at least one potassium salt and heating the resultant mixture to a temperature sufficient to form a homogeneous melt, then cooling the melt to form the potassium polyphosphate.

This may be carried out in one stage or in two stages, the latter involving a pre-heating to a temperature of from about 100°C to about 150°C to eliminate much of the water present in the reaction mixture prior to heating to an elevated temperature to form the homogeneous melt containing the potassium polyphosphate. This latter temperature will generally range from about 750°C to about 1,100°C.

The potassium salts which may be added to the phosphate acid sludge in accordance with the practice of the process of this new invention include among others, potassium chloride, potassium sulfate, potassium hydroxide, potassium carbonate, potassium sulfide, potassium polysulfide, and the like as well as mixtures thereof.

In formulating the mixture for the formation of potassium polyphosphates, the mol ratio of potassium to phosphorous should range from about 0.3 to about 2.0, preferably from about 0.5 to about 1.5.

There may also be added to the mixture a sodium salt which serves to reduce the temperature at which the melt is formed. The sodium salts which may be added include among others sodium chloride, sodium sulfate, sodium nitrate, sodium sulfide, sodium polysulfide and the like as well as mixture thereof.

Generally, the amount of sodium salt added is in an amount to provide a mol ratio of sodium to potassium ranging from about 0.2 to about 1.0, preferably from about 0.2 to about 0.4.

As indicated, the addition of the sodium salt to the system serves to reduce the fusion temperature or the temperature at which a homogeneous melt will form and otherwise serves only as a diluent.

There may be also added to the reaction system magnesium compounds as well as other micronutrients.

The magnesium compounds which may be added include among others, magnesium sulfate, magnesium oxide, magnesium chloride, magnesium orthophosphates and the like as well as mixtures thereof.

The addition of a magnesium compound to the reaction system serves to control the hygroscopicity of the resultant product as a plant food supplement, particularly where the phosphate acid sludges are formed during the manufacture of superphosphoric acid which causes a depletion of magnesium from the phosphate acid sludge.

In general, when a magnesium compound is added, it is added in a mol ratio of magnesium to potassium of from about 0.2 to about 0.1 preferably from about 0.3 to about 0.5.

Micronutrients which may be added to the system in addition to magnesium include the salts of manganese, boron, molybdenum, zinc, cobalt, copper and the like as well as mixtures thereof. They are added, generally, in minor amounts, but it is most unexpected that the reaction system will accept these compounds. Generally, the micronutrients are added as salts but their inclusion in the oxide form is also feasible.

As indicated, the process of converting the phosphate acid sludges to potassium polyphosphates may be carried out in a single stage at a temperature ranging from about 750°C to about 1,100°C depending upon the composition of the reactants. The actual temperature required can be readily determined in that reaction is complete when there is formed a homogeneous melt and all of the volatiles including hydrogen chloride, chlorine and fluorine, as well as water, have been evolved from the reaction system.

The melt, thus formed, is then cooled to form granular material or a solid mass which may be ground by conventional means such as hammer mills and the like into particles of a size suitable for use as a fertilizer.

Quenching or cooling the reaction mass may be by means of air or an inert liquid such as carbon tetrachloride. However, liquid quenching has not been found to have any material effect on the properties of the product.

Preferably, however, the process is carried out in stages. In the first stage, the reaction mixture is heated to a temperature from about 100°C to about 150°C or more to remove at least a substantial amount of the water from the reaction mixture. There is also evolved at this temperature some of the chlorine, hydrogen chloride, and fluorides which may be separated from the melt mixture of reactants by any conventional means such as a venturi scrubber.

When the water content of the mixture is substantially eliminated the resultant mixture is then transferred to the high temperature zone where it is heated until the formation of the homogeneous melt occurs with attendant elimination of the balance of the volatiles.

The high temperature reaction may be carried out in any apparatus conventional to the formation of phosphate fertilizers, including among others, rotary kilns, reverberatory furnaces, fluid bed reactors and the like. Using such apparatus, the reaction may be carried out at subatmospheric, atmospheric or superatmospheric pressures.

In the process of this invention the amount of potassium added can have an effect upon the hygroscopicity of the product. Below a mol ratio of potassium to phosphorous of about 0.5 the product generally has the property of being non-hygroscopic. At the mol ratio of from about 0.5 to about 0.8 the product is mildly hygroscopic and above a mol ratio of about 0.8 the product has the property of strong hygroscopicity. As can be seen, hygroscopicity increases with the mol ratio.

The hygroscopicity of the product at any mol ratio, however, can also be modified by the addition of a magnesium compound which tends to reduce the hygroscopicity of the product making it less moisture-sensitive and permitting ready distribution as a fertilizer in a dry form. The presence of a magnesium compound also adds valuable plant nutrients to the product.

The particular advantages of the potassium polyphosphate manufactured in accordance with the practice of this invention, are that all the $P_2O_5$ present is available as a fertilizer; polyphosphate content is high, ranging up to about 99 percent; and the product is high in total plant food content.

By varying the formulation, the product may be controlled to have slow release properties to permit its use as a long-term fertilizer. In addition, as indicated above, micronutrients can be readily and uniformly incorporated into the formulation.

While no wise limiting, the following are illustrative of the practice of the process of this invention. Unless otherwise indicated, all percentages are reported as weight percent.

In the examples, the following test methods or apparatus were employed during analysis of the feed or product:
1. $P_2O_5$ Content, Wt. %÷ AOAC * (*AOAC = Association of Official Analytical Chemists, P.O. Box 540 Benjamin Franklin Station, Washington, D.C. 20044) Method 12, pg. 13, 11th Edition, 1970
2. $P_2O_5$ Citrate Insoluble, Wt. %÷AOAC Method 13, pg. 14, 11th Edition, 1970
3. $P_2O_5$ 1 hour water solubility, Wt. %÷AOAC, pg, 14 - 11th Edition, 1970
4. $K_2O$ Water Soluble Content, Wt. %÷AOAC, pg. 22 - 11th Edition, 1970; 2.090–2.092
5. $K_2O$ Total Content, Wt. % ÷ Analyzed by Atomic Absorption Apparatus.

EXAMPLE 1

A quantity of superphosphoric acid solids was obtained by centrifuging freshly concentrated high strength wet process superphosphoric acid (83% $P_2O_5$) in a basket centrifuge lined with teflon cloth. The acid temperature was approximately 180°C. Water soluble $P_2O_5$ remaining in the cake was removed by two successive hot water washes.

The residual sludge cake was removed from the centrifuge and oven dried. A typical analysis of the sludge solids was about 75–80% $P_2O_5$, 6% $Fe_2O_3$ and 12% $Al_2O_3$, with the $P_2O_5$ in a highly insoluble form and not available as plant food.

One hundred seventy-three parts by weight of the sludge solids averaging 77.8% $P_2O_5$ were dry mixed with 177 parts by weight potassium chloride, (61% $K_2O$), and heated in a direct gas fired radiant roof furnace. The mixture quickly became molten and evolved hydrogen chloride and chlorine fumes which were removed from the furnace with the waste combustion gases.

The maximum temperature of the molten surface, measured with an optical pyrometer, was about 1,060°C. After about 1½ hours in the furnace, evolution of gases had stopped, the melt was quickly poured on to a 6-inch diameter horizontal stainless steel disc rotating at 200 rpm and formed irregularly sized glassy prills. The product analysis was:

| Component | Composition |
|---|---|
| $P_2O_5^{(1)}$ | 47.15% |
| $P_2O_5^{(2)}$ | 0.05% |
| $P_2O_5^{(3)}$ | 39.32% |
| $K_2O^{(4)}$ | 35.75% |
| Chlorine | 0.21% |
| pH (1% solution) | 7.2 |
| Moisture Absorption (24 hours at 75°F, 75% RH) | 4.0% |

The formerly water insoluble $P_2O_5$ was almost completely converted to available plant food. The product was low in residual chlorine, thus making it suitable for such crops as tobacco and potatoes. The moisture absorption for this product was sufficiently low to permit ready application to crops. Being water soluble, the product could also be used in the preparation of liquid or slurry fertilizers.

EXAMPLE 2

A sludge acid was obtained from wet process phosphoric acid production and consisted of aqueous phosphoric acid, its dissolved impurities, and solids precipitated during the concentration and clarification of the wet process phosphoric acid.

The liquid phase contains between 45% and 56% $P_2O_5$, and the solid phase was a mixture of salts including gypsum, metal fluorides, metal phosphates, silicofluorides and complex salts such as ralstonite. Sludge acid was pumpable up to a solids content of about 25% by weight. The solids commonly contained from about 5% to 15% of $P_2O_5$ in an insoluble form.

Two hundred twenty-seven parts by weight of the sludge acid containing 48.9% $P_2O_5$ and 10.4% solids were mixed with 82 parts by weight of potassium chloride (61% $K_2O$) to form a paste. This mixture was heated with agitation to about 125°C for about 1½ hours to create a vortex to prevent spillage due to foaming. During this initial heating, steam and hydrogen chloride fumes were evolved and removed with a venturi scrubber system.

The hot semi-reacted material was then transferred to a gas fired furnace, brought to 840°C and held at that temperature for about 1 hour. The melt formed was poured out as a thin layer onto a rotating heavy stainless steel plate, quenched and solidified. The product analyzed was as follows:

| Component | Composition |
|---|---|
| $P_2O_5^{(1)}$ | 60.41% |
| $P_2O_5^{(2)}$ | Not detectable |
| $P_2O_5^{(3)}$ | 2.11% |
| $P_2O_5$ conversion to non ortho form | 99.30% |
| $K_2O^{(4)}$ | 30.05% |
| CaO | 3.82% |
| Chlorine | 0.77% |
| Moisture absorption | |
| (24 hrs. at 75°F, 75% RH) | 0.10% |
| (165 hrs. at 75°F, 75% RH) | 1.70% |

The $P_2O_5$ content of the sludge acid was made completely available as plant food.

Compared with the product in Example 1, the product was found to be more slowly soluble in water and a slow release fertilizer. The hygroscopicity of this material was negligible.

EXAMPLE 3

4.77 parts by weight of dry solids precipitated from high strength wet process superphosphoric acid similar to that used in Example 1 and containing 78.5% of $P_2O_5$, was dry mixed with 5.90 parts by weight fertilizer grade potassium chloride (61% $K_2O$) and 1.35 parts by weight sodium chloride, to form a mixture having a mol ratio of $K_2O$ to $P_2O_5$ equal to 1.45, and a mol ratio of $Na_2O$ to $K_2O$ to 0.3.

The mixture was heated in a vented muffle furnace for approximately 1 hour. Maximum steady furnace temperature during the fusion was 800°C. As the mixture heated, it changed from solid to molten form, and bubbled with evolution of gases including water vapor, hydrogen chloride, phosphorous oxide vapor and iron chloride vapor.

In the final molten state, at 800°C, the melt was green in color, and poured easily onto a heavy stainless steel plate and there quenched and solidifed. The solid product analyzed was as follows:

| Component | Composition |
|---|---|
| $P_2O_5^{(1)}$ | 37.96% |
| $P_2O_5^{(2)}$ | 0.11% |
| $P_2O_5^{(3)}$ | 8.70% |
| $K_2O^{(5)}$ | 34.87% |
| $Na_2O$ | 6.75% |
| $Fe_2O_3$ | 4.19% |
| $Fe_2O_3$ (Water soluble) | 2.15% |

Substitution of part of the potassium content by sodium, appeared to increase the water solubility, also reduce the temperature required to complete the fusion and created a low viscosity melt.

EXAMPLE 4

4.50 parts by weight of dry sludge acid solids precipitated from high strength wet process superphosphoric acid and containing 78.5% of $P_2O_5$, was dry mixed with 5.15 parts by weight fertilizer grade potassium chloride (61% $K_2O$) and 2.36 parts by weight of anhydrous magnesium sulfate to form a mixture having a mol ratio of $K_2O$ to $P_2O_5$ equal to 1.34 and a mol ratio of MgO to $K_2O$ equal to 0.59.

The mixture was heated in a vented muffle furnace for approximately 1 hour. Maximum steady furnace temperature during the fusion was 875°C. As the mixture heated, it changed from solid to molten form, and bubbled with evolution of gases including water vapor, hydrogen chloride, phosphorous oxide vapor and iron chloride vapor.

In the final molten state, at 875°C, the melt was deep-green in color and highly viscous. The melt was poured out onto a heavy stainless steel plate and then quenched and solidified. The solid product analyzed as follows:

| Component | Composition |
|---|---|
| $P_2O_5^{(1)}$ | 37.63% |
| $P_2O_5^{(2)}$ | 0 |
| $P_2O_5^{(3)}$ | 0.59% |
| $K_2O^{(4)}$ | 31.60% |
| MgO | 7.91% |
| pH (1% solution) | 7.55 |

Substitution of part of the potassium by magnesium depressed water solubility.

EXAMPLE 5

A potassium polyphosphate containing agronomically desirable quantities of micronutrients was made as follows:

Part of sludge acid employed in Example 2, fertilizer grade potassium chloride (61% $K_2O$) and micronutrient containing salts were premixed in a tank in the quantities shown in Table 1.

The contents were transferred to a heated, agitated prereaction tank where they were held for about 1 hour at 100°–125°C. The slurry so formed was pumped continuously to an elevated weir flow controlling device which fed an equivalent to approximately 18 pounds per hour of the slurry to a high temperature reactor with any excess flow from the pump being returned to the pre-reaction tank.

The high temperature reactor was a direct gas fired countercurrent rotary kiln lined with a zircon ramming mix. Estimated retention time in the kiln was approximately 1 hour, and maximum pool temperature at the discharge end of the kiln was about 845°C.

The melt was discharged continuously onto a water cooled stainless steel plate, thus forming a hard glassy form of potassium polyphosphate. This product was readily pulverized in a hammer mill to −10 +35 mesh, with less than 5% of the material forming fines (−35 mesh). The product analyzed as follows:

| Component | Composition |
|---|---|
| $P_2O_5$ [1] | 49.87% |
| $P_2O_5$ conversion to non ortho form | 93.10% |
| $P_2O_5$ [3] | 6.93% |
| $K_2O$ [4] | 29.15% |
| $K_2O$ [5] | 26.54% |
| Chlorine | 0.14% |
| Moisture Absorption (24hrs. at 75°F, 75% RH) | 10.10% |

TABLE 1

Basic Formulation for Feed

| Ingredient | Parts by Wgt. | Micronutrient Rate Parts by wgt./100 Parts by wgt. $P_2O_5$ |
|---|---|---|
| Sludge Acid (46.3% $P_2O_5$) | 10.0 | |
| Potash (61% $K_2O$) | 3.792 | |
| Borax ($Na_2B_4O_7 \cdot 10H_2O$) | 0.408 | Boron=1.0 |
| Cobalt Nitrate [$Co(NO_3)_2 \cdot 6H_2O$] | 0.029 | Cobalt=0.125 |
| Cuprous Oxide ($Cu_2O$) | 0.052 | Copper=1.0 |
| Potassium Permanganate ($KMnO_4$) | 0.132 | Manganese=1.0 |
| Molybdenum Oxide ($MoO_3$) | 0.019 | Molybdenum=0.25 |
| Zinc Oxide (ZnO) | 0.118 | Zinc=2.0 |

EXAMPLES 6–10

Several studies were conducted in which sodium-potassium molar ratios were varied from 0.20 to 0.40, in .05 mole increments. The levels of $Na_2O$ added, represented 6 to 10% $Na_2O$ in the final product. Analytical data from these tests shown in Table 2 indicated complete citrate solubility. Analysis for $K_2O$ was for water-soluble $K_2O$ content. Total $K_2O$ was not analyzed in these tests.

EXAMPLES 11 to 15

The following studies were made to determine the effect of solubility of potassium polyphosphates produced with magnesium addition. This is because magnesium is a major secondary plant food. The results shown in Table 3 indicate that the presence of magnesium tends to make the product completely citrate soluble. However, it raises fusion temperature by about 150°C for products containing from about 2.5% to about 8% magnesium oxide. Magnesium was added to the system as magnesium sulfate.

TABLE 2.—EFFECT OF SODIUM ON POTASSIUM POLYPHOSPHATE SOLUBILITY

| Ex. | Mole ratio $Na_2O/K_2O$ | Mole ratio $K_2O/P_2O_5$ | Temp. (°C) | Total $P_2O_5$ (percent) | Citrate insol. $P_2O_5$ (percent) | Ortho W.S. $P_2O_5$ (percent) | $K_2O$[4] (percent) | $Na_2O$ (percent) | $Fe_2O_3$ | $Fe_2O_3$ (W.S.) | Quench |
|---|---|---|---|---|---|---|---|---|---|---|---|
| 6 | 0.20 | 1.45 | 800 | 37.96 | 0.11 | 8.70 | 34.87 | 6.75 | 4.19 | 2.15 | Melt poured cold plate. |
| 7 | .25 | 1.45 | 800 | 41.37 | .17 | 5.07 | 31.43 | 6.46 | | | Do. |
| 8 | .30 | 1.45 | 800 | 37.18 | 2.01 | 1.32 | 31.33 | 8.73 | 3.99 | 0.54 | Do. |
| 9 | .35 | 1.45 | 800 | 37.76 | 0.11 | 1.96 | 30.15 | 9.84 | 4.22 | .41 | Do. |
| 10 | .40 | 1.45 | 800 | 38.62 | .22 | 2.63 | 29.07 | 10.04 | 4.08 | .55 | Do. |

TABLE 3.—EFFECT OF MAGNESIUM ON POTASSIUM POLYPHOSPHATE SOLUBILITY

| Ex. | $Na_2O/K_2O$ | $K_2O/P_2O_5$ | Temp. (°C) | Total[1] $P_2O_5$ (percent) | Citrate[2] insol. $P_2O_5$ (percent) | Ortho W.S. $P_2O_5$ (percent) | Total[5] $K_2O$ (percent) | W.S.[4] $K_2O$ (percent) | MgO (percent) | $Fe_2O_3$ (percent) | W.S. $Fe_2O_3$ (percent) | Quench |
|---|---|---|---|---|---|---|---|---|---|---|---|---|
| 11 | 0.20 | 1.45 | 925 | 44.52 | 0 | 2.01 | 31.67 | 27.15 | 2.58 | 4.32 | 1.02 | Melt poured cold plate. |
| 12 | .30 | 1.45 | 950 | 45.44 | 0 | 1.78 | 30.01 | 17.94 | 4.73 | 4.54 | 0.12 | Do. |
| 13 | .40 | 1.45 | 1,000 | 44.26 | 0 | 0.68 | 28.14 | 15.98 | 6.36 | 4.32 | .09 | Do. |
| 14 | .50 | 1.45 | 1,000 | 39.12 | 0 | .61 | 32.82 | 21.23 | 6.94 | 4.03 | .08 | Do. |
| 15 | .60 | 1.45 | 1,050 | 38.09 | 0 | 3.35 | 31.02 | 24.41 | 7.99 | 3.76 | .04 | Do. |

EXAMPLES 16 to 23

To investigate the effect of quenching on water solubility, of potassium polyphosphates formed from acid sludge a number of tests were conducted at $K_2O/P_2O_5$ molar ratios of 1.2, 1.4, 1.6, and 1.8. One-half the melt from each test was rapidly quenched by pouring the melt into cold $CCl_4$. The other half was air-quenched by pouring onto a metal plate at ambient temperature. Data from this series are shown in Table 4.

No significant difference on product water-solubility between rapid and slow quenching was determined. As the $K_2O/P_2O_5$ molar ratio was increased, the fusion temperature increased. The temperature spread from a M.R. of 1.2 and 1.8 was about 100°C.

EXAMPLES 24 to 27

The following tests were conducted to determine the effect of using potassium sulfate as opposed to potassium chloride. Two tests were conducted at a $K_2O/P_2O_5$ molar ratio of 1.34 and two at a M.R. of 1.45. Below a $K_2O/P_2O_5$ weight ratio of 1:1, there appeared to be no material difference in product quality but that KCl had a more detrimental effect upon citrate solubility than potassium sulfate.

EXAMPLE 28

To determine the effect of secondary or trace elements on potassium polyphosphate solubility a fusion mixture containing the following ratios by weight % were evaluated.

| $P_2O_5$ | $K_2O$ | MgO | ZnO | $B_2O_3$ | $MnO_3$ | $MoO_2$ |
|---|---|---|---|---|---|---|
| 27 | 26 | 4 | 2.0 | 0.5 | 0.5 | 0.5 |

The temperatures required to effect fusion was about 1,000°C. Chemical analysis at the feed mixtures agreed closely with calcined values. The product was completely soluble in ammonium citrate and yet contained negligible water-soluble ortho phosphoric acid. The results are shown in Table 6.

TABLE 4

| Ex. | Quench rate | Mole ratio ($K_2O/P_2O_5$) | Temp. (°C) | Total[1] $P_2O_5$ (percent) | C.I.[2] $P_2O_5$ (percent) | Ortho W.S. $P_2O_5$ (percent) | 24 hr. total W.S. $P_2O_5$ (percent) | 24 hr. ortho W.S. $P_2O_5$ (percent) | Total[5] $K_2O$ (percent) | W.S.[4] $K_2O$ (percent) | Total $Fe_2O_3$ (percent) | W.S. $Fe_2O_3$ (percent) | Quench media |
|---|---|---|---|---|---|---|---|---|---|---|---|---|---|
| 16 | Rapid | 1.2 | 800 | 46.83 | 0.17 | 9.53 | 46.13 | 12.33 | 36.03 | 34.09 | 4.62 | 3.65 | Cold $CCl_4$. |
| 17 | Slow | 1.2 |  | 47.21 | .23 | 9.59 | 46.50 | 11.76 | 35.83 | 34.46 |  |  | Air. |
| 18 | Rapid | 1.4 | 825 | 44.84 | .11 | 9.25 | 44.15 | 10.18 | 36.29 | 34.91 | 4.58 | 3.95 | Cold $CCl_4$. |
| 19 | Slow | 1.4 | 825 | 43.67 | .24 | 9.89 | 43.32 | 10.41 | 38.04 | 35.91 |  |  | Air. |
| 20 | Rapid | 1.6 | 850 | 40.08 | 3.88 | 7.95 | 35.71 | 8.25 | 37.67 | 35.84 | 3.92 | 3.25 | Cold $CCl_4$. |
| 21 | Slow | 1.6 | 850 | 41.95 | 2.51 | 8.19 | 38.13 | 9.25 | 36.82 | 35.29 |  |  | Air. |
| 22 | Rapid | 1.8 | 900 | 38.92 | 2.42 | 13.51 | 34.83 | 13.56 | 41.20 | 37.82 | 3.95 | 3.21 | Cold $CCl_4$. |
| 23 | Slow | 1.8 | 900 | 39.84 | 2.17 | 12.58 | 38.06 | 13.25 | 40.01 | 37.85 |  |  | Air. |

TABLE 5

| Ex. | Mole ratio ($K_2O/P_2O_5$) | Fusion medium | Temp. (°C) | Total[1] $P_2O_5$ (percent) | C.I.[2] $P_2O_5$ (percent) | W.S. $P_2O_5$ (percent) | W.S.[4] $K_2O$ (percent) |
|---|---|---|---|---|---|---|---|
| 24 | 1.34 | $K_2SO_4$ | 825 | 40.81 | 0 | 11.00 | 36.86 |
| 25 | 1.34 | KCl | 825 | 45.56 | 0 | 9.64 | 36.26 |
| 26 | 1.45 | $K_2SO_4$ | 825 | 42.86 | 0 | 4.59 | 36.98 |
| 27 | 1.45 | KCl | 825 | 33.52 | 5.61 | 0.85 | 33.83 |

TABLE 6

| Description | Temp. (°C) | Total[1] $P_2O_5$ (percent) | C.I.[2] $P_2O_5$ (percent) | W.S. $P_2O_5$ (percent) | 24 hr. ortho $P_2O_5$ W.S. | Total[5] $K_2O$ (percent) | $MnO_2$ (percent) | ZnO (percent) | MoO (percent) | $B_2O_3$ (percent) | MgO |
|---|---|---|---|---|---|---|---|---|---|---|---|
| Feed mix $K_2O/P_2O_5 = 1.45$ plus A as fusion media |  | 27.05 | 25.78 | 0 | 0 | 25.39 | 0.53 | 2.07 | 0.60 | 0.44 | 3.92 |
| Product | 1,000 | 37.50 | 0 | 0.06 | 0.37 | 30.75 | .62 | 1.69 | .13 |  | 6.52 |

A  KCl, $MgSO_4$, $ZnSO_4 \cdot 7H_2O$, $H_3BO_3$, $MnO_2$, $Na_2MoO_4 \cdot 2H_2O$.

What is claimed is:

1. A process for the production of potassium polyphosphate which comprises:
   a. heating a mixture of at least one potassium salt and at least a phosphate acid sludge obtained in the clarification of wet process phosphoric acid in which the mole ratio of potassium to phosphorous is from about 0.3 to about 2.0 to a temperature sufficient to form a homogeneous melt comprising potassium polyphosphate formed by the reaction of the potassium salt and the phosphate acid sludge; and
   b. solidifying said homogeneous melt.

2. A process as claimed in claim 1 in which the mixture of the potassium salt and phosphate acid sludge is heated to a temperature of from about 750°C to about 1,100°C.

3. A process as claimed in claim 1 in which the potassium salt is selected from the group consisting of potassium chloride, potassium sulfate, potassium hydroxide, potassium carbonate, potassium sulfide and potassium polysulfide.

4. A process as claimed in claim 2 in which the potassium salt is selected from the group consisting of potassium chloride, potassium sulfate, potassium hydroxide, potassium carbonate, potassium sulfide and potassium polysulfide.

5. A process as claimed in claim 1 in which the mixture of the phosphate acid sludge and the potassium salt is preheated to an intermediate temperature to remove at least a substantial amount of water from said mixture.

6. A process as claimed in claim 5 in which the mixture of phosphate acid sludge and the potassium salt is preheated to a temperature of from about 100°C to about 150°C.

7. A process as claimed in claim 2 in which the mixture of the phosphate acid sludge and the potassium salt is preheated to an intermediate temperature to remove at least a substantial amount of water from said mixture.

8. A process as claimed in claim 3 in which the mixture of phosphate acid sludge and the potassium salt is preheated to an intermediate temperature to remove at least a substantial amount of water from said mixture.

9. A process as claimed in claim 1 in which the mole ratio of potassium to phosphorous is from about 0.5 to about 1.5.

10. A process as claimed in claim 2 in which the mole ratio of potassium to phosphorous is from about 0.5 to about 1.5.

11. A process as claimed in claim 1 in which at least one sodium salt is added to the mixture of phosphate and sludge and potassium salt prior to reaction of mixture, the mole ratio of added sodium to potassium in the mixture being from about 0.2 to about 1.0.

12. A process as claimed in claim 11 in which the sodium salt is selected from the group consisting of sodium chloride, sodium sulfate, sodium nitrate, sodium sulfide, and sodium polysulfide.

13. A process as claimed in claim 11 in which the mole ratio of sodium to potassium is from about 0.2 to about 0.4.

14. A process as claimed in claim 2 in which at least one sodium salt is added to the mixture of phosphate and sludge and potassium salt prior to reaction of mixture, the mole ratio of added sodium to potassium in the mixture being from about 0.2 to about 1.0.

15. A process as claimed in claim 14 in which the sodium salt is selected from the group consisting of sodium chloride, sodium sulfate, sodium nitrate, sodium sulfide and sodium polysulfide.

16. A process as claimed in claim 14 in which the mole ratio of sodium to potassium is from about 0.2 to about 0.4.

17. A process as claimed in claim 1 in which at least one magnesium salt is added to the mixture of phosphate and sludge and potassium salt prior to reacting the mole ratio of magnesium to potassium in the mixture being from about 0.2 to about 1.0.

18. A process as claimed in claim 17 in which said magnesium salt is selected from the group consisting of magnesium sulfate, magnesium oxide-magnesium chloride, and magnesium ortho-phosphates.

19. The process of claim 17 wherein the mole ratio of magnesium to potassium is from about 0.3 to about 0.5.

20. A process as claimed in claim 2 in which at least one magnesium salt is added to the mixture of phosphate acid sludge and potassium salt prior to reacting the potassium salt and phosphate acid sludge the mole ratio of magnesium to potassium in the mixture being from about 0.2 to about 1.0.

21. A process as claimed in claim 20 in which said magnesium salt is selected from the group consisting of magnesium sulfate, magnesium oxide-magnesium chloride, and magnesium ortho-phosphates.

22. The process of claim 20 wherein the mole ratio of magnesium to potassium is from about 0.3 to about 0.5.

23. A process as claimed in claim 11 in which at least one magnesium salt is added to the mixture of phosphate and sludge and potassium salt prior to reacting the mole ratio of magnesium to potassium in the mixture being from about 0.2 to about 1.0.

24. A process as claimed in claim 23 in which said magnesium salt is selected from the group consisting of magnesium sulfate, magnesium oxide-magnesium chloride, and magnesium ortho-phosphates.

25. The process of claim 23 wherein the mole ratio of magnesium to potassium is from about 0.3 to about 0.5.

26. A process as claimed in claim 1 in which micronutrients are added to the mixture prior to reaction.

27. A process as claimed in claim 26 in which the micronutrients are selected from the group consisting of salts of manganese, boron, molybdenum, zinc, cobalt and copper.

28. A process as claimed in claim 2 in which micronutrients are added to the mixture prior to reaction.

29. A process as claimed in claim 28, in which the micronutrients are selected from the group consisting of salts of manganese, boron, molybdenum, zinc, cobalt and copper.

30. A process as claimed in claim 11 in which micronutrients are added to the mixture prior to reaction.

31. A process as claimed in claim 30 in which the micronutrients are selected from the group consisting of salts of manganese, boron, molybdenum, zinc, cobalt and copper.

32. A process as claimed in claim 17 in which micronutrients are added to the mixture prior to reaction.

33. A process as claimed in claim 32 in which the micronutrients are selected from the group consisting of salts of manganese, boron, molybdenum, zinc, cobalt and copper.

* * * * *